US012810478B2

(12) United States Patent

Chen et al.

(10) Patent No.: US 12,810,478 B2
(45) Date of Patent: Nov. 24, 2026

(54) IMAGE PROCESSING DEVICE AND METHOD THAT GENERATE MULTIPLE IMAGE DATA WITH DIFFERENT FORMATS

(71) Applicant: SigmaStar Technology Ltd., Xiamen (CN)

(72) Inventors: Fu-Cheng Chen, Zhubei City (TW); Jia-Lin Ding, Shanghai (CN); Jiang-Nan Xia, Shanghai (CN)

(73) Assignee: SIGMASTAR TECHNOLOGY LTD., Xiamen (CN)

( * ) Notice: Subject to any disclaimer, the term of this patent is extended or adjusted under 35 U.S.C. 154(b) by 203 days.

(21) Appl. No.: 18/895,506

(22) Filed: Sep. 25, 2024

(65) Prior Publication Data

US 2025/0124602 A1 Apr. 17, 2025

(30) Foreign Application Priority Data

Oct. 11, 2023 (CN) ......................... 202311318563.0

(51) Int. Cl.
*G06T 9/00* (2006.01)
*G06T 1/60* (2006.01)

(52) U.S. Cl.
CPC . *G06T 9/00* (2013.01); *G06T 1/60* (2013.01)

(58) Field of Classification Search
None
See application file for complete search history.

(56) References Cited

U.S. PATENT DOCUMENTS

| | | | | |
|---|---|---|---|---|
| 7,978,921 | B1 * | 7/2011 | Donovan | H04N 19/98 708/203 |
| 2009/0274365 | A1 * | 11/2009 | Tsuda | G06T 3/4007 382/166 |
| 2020/0007866 | A1 * | 1/2020 | Martinelli | H04N 1/64 |
| 2021/0192792 | A1 * | 6/2021 | Baick | G06T 7/0002 |
| 2021/0344900 | A1 * | 11/2021 | Jun | H04N 19/12 |
| 2023/0400980 | A1 * | 12/2023 | Wang | G06F 3/0604 |
| 2024/0095962 | A1 * | 3/2024 | Karandikar | G06T 3/4015 |

* cited by examiner

*Primary Examiner* — Oneal R Mistry
(74) *Attorney, Agent, or Firm* — Edell, Shapiro & Finnan, LLC

(57) ABSTRACT

An image processing device includes a memory, a frame compression circuit, an image processing circuit, an image encoding circuit and a controller. The memory includes a first storage space and a second storage space. The frame compression circuit generates first data based on input image data and stores the first data to the first storage space. The image processing circuit generates second data based on the input image data and stores the second data to the second storage space. The image encoding circuit reads the second data from the second storage space, encodes the second data to generate third data, and stores the third data to the first storage space. The controller outputs the first data and the third data from the first storage space.

10 Claims, 4 Drawing Sheets

IMAGE PROCESSING DEVICE AND METHOD THAT GENERATE MULTIPLE IMAGE DATA WITH DIFFERENT FORMATS

This application claims the benefit of China application Serial No. CN202311318563.0, filed on Oct. 11, 2023, the subject matter of which is incorporated herein by reference.

BACKGROUND OF THE INVENTION

Field of the Invention

The present application relates to an image processing device, and more particularly to image processing device and method that generate image data with different formats corresponding to a same frame.

Description of the Related Art

In general, an image processing device in a low-power consumption application is operable to implement only one process within a same frame period. For example, within the same frame period, the image processing device is configured to generate raw data corresponding to a frame. Or, within the same frame period, the image processing device is configured to generate compressed image data corresponding to the frame. As such, diversified requirements for subsequent applications cannot be fulfilled.

SUMMARY OF THE INVENTION

In some embodiments, it is an object of the present application to provide image processing device and method that generate image data with different data formats corresponding to a same frame, so as to improve the drawbacks of the prior art.

In some embodiments, an image processing device includes a memory, a frame compression circuit, an image processing circuit, an image encoding circuit and a controller. The memory includes a first storage space and a second storage space. The frame compression circuit generates first data based on input image data and stores the first data to the first storage space. The image processing circuit generates second data based on the input image data and stores the second data to the second storage space. The image encoding circuit reads the second data from the second storage space, encodes the second data to generate third data, and stores the third data to the first storage space. The controller outputs the first data and the third data from the first storage space. The frame compression circuit and the image encoding circuit access the first storage space through a first connection port, and the image processing circuit accesses the second storage space through a second connection port different from the first connection port.

In some embodiments, an image processing method includes operations of: compressing input image data to generate first data, and storing the first data to a first storage space of a memory; performing image processing on the input image data to generate second data, and storing the second data to a second storage space of the memory; reading the second data from the second storage space, encoding the second data to generate third data, and storing the third data to the first storage space; and outputting the first data and the third data from the first storage space.

Features, implementations and effects of the present application are described in detail in preferred embodiments with the accompanying drawings below.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

All terms used in the literature have commonly recognized meanings. Definitions of the terms in commonly used dictionaries and examples discussed in the disclosure of the present application are merely exemplary, and are not to be construed as limitations to the scope or the meanings of the present application. Similarly, the present application is not limited to the embodiments enumerated in the description of the application.

The term "coupled" or "connected" used in the literature refers to two or multiple elements being directly and physically or electrically in contact with each other, or indirectly and physically or electrically in contact with each other, and may also refer to two or more elements operating or acting with each other. As given in the literature, the term "circuit" may be a device connected by at least one transistor and/or at least one active element by a predetermined means so as to process signals.

Figure 1:
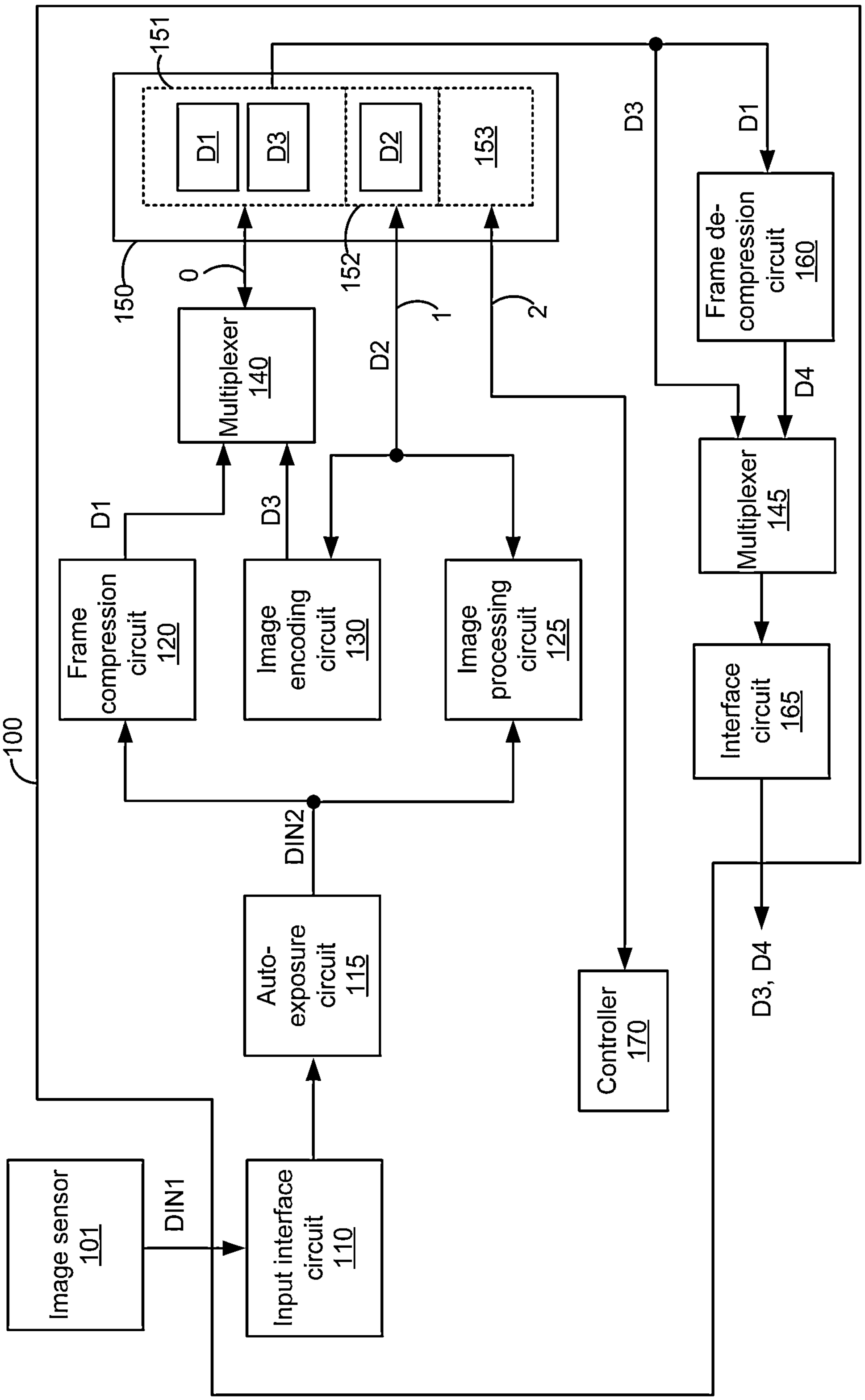
FIG. 1 is a schematic diagram of an image processing device according to some embodiments of the present application.

FIG. 1 shows a schematic diagram of an image processing device 100 according to some embodiments of the present application. The image processing device 100 may receive input image data DIN1 from an image sensor 101, and generate multiple sets of image data with different formats based on the input image data DIN1.

The image processing device 100 includes an input interface circuit 110, an auto-exposure circuit 115, a frame compression circuit 120, an image processing circuit 125, an image encoding circuit 130, a multiplexer 140, a multiplexer 145, a memory 150, a frame decompression circuit 160, an interface circuit 165 and a controller 170. The input interface circuit 110 may receive the input image data DIN1 from the image sensor 101, and transmit the input image data DIN1 to the auto-exposure circuit 115. In some embodiments, the input interface circuit 110 may be, for example but not limited to, a digital video port circuit. The auto-exposure circuit 115 may generate an exposure parameter according to the input image data DIN1 to control the image sensor 101, and generate input image data DIN2. In some embodiments, the input image data DIN2 is equivalent to raw image data.

The frame compression circuit 120 may generate data D1 based on the input image data DIN2. For example, each pixel data in the input image data DIN2 is 8-bit data. The frame compression circuit 120 may compress, by using frame buffer compression, the input image data DIN2, such that each pixel data is reduced to 6-bit data to thereby generate the data D1. In some embodiments, the data D1 may be compressed raw image data. The memory 150 includes multiple storage spaces 151 to 153. The frame compression circuit 120 and the image encoding circuit 130 may access the storage space 151 through a connection port 0, the image processing circuit 125 may access the storage space 152 through a connection port 1, and the controller 170 may access the storage space 153 through a connection port 2. For example, the frame compression circuit 120 may store the data D1 to the storage space 151. In some embodiments, the multiple connection ports 0 to 2 may be, for example but not limited to, connection ports in an internal memory interface. In some embodiments, the memory 150 may be, for example but not limited to, a static random access memory (SRAM).

The image processing circuit 125 may generate the data D2 based on the input image data DIN2, and store the data D2 to the storage space 152. In some embodiments, the image processing circuit 125 may perform image processing such as auto white balance and image format conversion (for example, conversion into the YUV format) on the input image data DIN2, so as to generate the data D2. The image encoding circuit 130 may read the data D2 from the storage space 152, generate D3 based on the data D2, and store the data D3 to the storage space 151. For example, the image encoding circuit 130 may encode the data D2 by an image encoding technique to generate the data D3. In some embodiments, the data D3 may be a Joint Photographic Experts Group (JPEG) image file. In some embodiments, a data amount (or a data size) of the data D1 is greater than a data amount (or a data size) of the data D3. For example, the data D1 may be raw image data, the data D3 may be a JPEG file, and both of the above may correspond to complete contents of a same frame. In some embodiments, the data D1 (or data D4 generated based on the data D1) may be used to generate video data, and the data D3 may be provided for quick preview; however, the present application is not limited to the examples above.

The controller 170 may output the data D1 and/or the data D3 from the storage space 151. More specifically, the controller 170 is operable to control and/or configure operations of multiple circuits (including, for example but not limited to, the frame compression circuit 120, the image processing circuit 125, the image encoding circuit 130, the multiplexer 140, the multiplexer 145 and/or the memory 150) in the image processing device 100. In some embodiments, the controller 170 may include multiple registers (not shown) for configuring the multiple circuits above. For example, the controller 170 may set a first register among these registers, and the frame compression circuit 120 and the image encoding circuit 130 may determine according to a data value of the first register whether the storage space 151 can be accessed. For example, after the frame compression circuit 120 stores the data D1 to the storage space 151, the controller 170 may configure the data value of the first register to be a first predetermined value, such that the image encoding circuit 130 may determine according to the data value that the image encoding circuit 130 has access permission to access the storage space 151 (that is, allowed to access the storage space 151 through the connection port 0). Alternatively, after the frame compression circuit 130 stores the data D3 to the storage space 151, the controller 170 may switch the data value of the first register back to a second predetermined value, such that the frame compression circuit 120 may determine according to the data value that the frame compression circuit 120 has access permission to access the storage space 151 so as to store the next data D1. In some embodiments, the controller 170 may temporarily store parameters related to operations of other circuits in the storage space 153. With the configuration above, the multiple circuits above may share the storage spaces in the memory 150 according to the configuration of the controller 170. Thus, these circuits do not need to involve an additional mechanism to compete for the memory 150, thereby reducing the overall power consumption.

Similarly, the multiplexer 140 and the multiplexer 145 may determine according to similar operations what data is to be output. For example, the multiplexer 140 may be controlled by the data value of the first register above. When the data value of the first register is the first predetermined value, the multiplexer 140 may output the data D3 to the storage space 151. Alternatively, when the data value of the first register is the second predetermined value, the multiplexer 140 may output the data D1 to the storage space 151. Similarly, configuration details of how the controller 170 uses the multiple registers to configure other related operations of other circuits can be derived. In some embodiments, the controller 170 may be a microprocessor and/or microcontroller executing a predetermined process, and is, for example but not limited to, a 8051 single-chip microcontroller.

According to the control of the controller 170, the multiplexer 145 may output the data D3 from the storage space 151 or receive the data D4 from the frame decompression circuit 160. The frame decompression circuit 160 may receive the data D1 from the storage space 151 and generate data D4 based on the data D1. For example, in the foregoing example, each pixel data in the input image data D1 is 6-bit data. The frame decompression circuit 160 may recover these pixel data into 8-bit data so as to generate the data D4. The interface circuit 165 may receive the data D3 and the data D4 from the multiplexer 145, and transmit the data D3 and the data D4 to at least one host device (for example but not limited to, a video capturing chip 300 and/or a network device 310 in FIG. 3), for subsequent image applications. In some embodiments, the interface circuit 165 may be, for example but not limited to, a Serial Peripheral Interface (SPI) slave controller.

It should be noted that the above configuration details of the image processing device 100 in FIG. 1 are merely examples, and the present application is not limited to these examples. In an actual application, the image processing device 100 may further include circuits such as an Inter-Integrated Circuit (I2) bus, a master/slave controller, an infrared controller, a timer, a clock generator and/or a motion circuit. In some embodiments, the multiple circuits described above may be implemented by at least one digital circuit having an image processing or data conversion ability.

Figure 2:
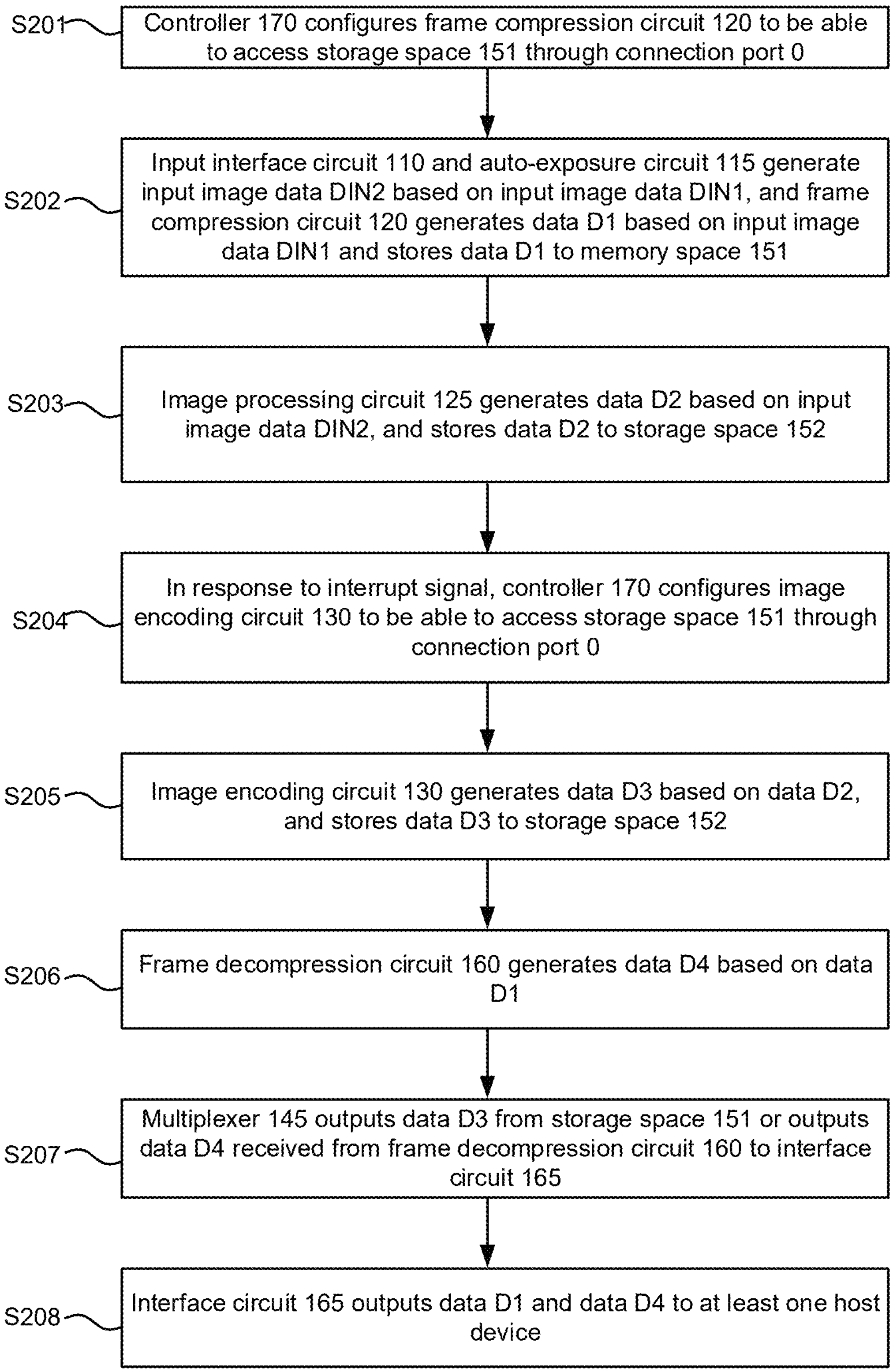
FIG. 2 is a flowchart of operations of the image processing device in FIG. 1 according to some embodiments of the present application.

FIG. 2 shows a flowchart of operations of the image processing device 100 in FIG. 1 according to some embodiments of the present application. In operation S201, the controller 170 configures the frame compression circuit 120 to be able to access the storage space 151 through the connection port 0. In operation S202, the input interface circuit 110 and the auto-exposure circuit 115 generate the input image data DIN2 based on the input image data DIN1, and the frame compression circuit 120 generates the data D1 based on the input image data DIN2, and stores the data D1 to the storage space 151.

For example, the controller 170 may configure the data value of the first register above to the second predetermined value, such that the frame compression circuit 120 has access permission to access the storage space 151, and the multiplexer 140 may transmit an output (that is, the data D1) of the frame compression circuit 120 to the storage space 151. In this case, the frame compression circuit 120 may generate the data D1 based on the input image data DIN2 to thereby store the data D1 to the storage space 151.

Again referring to FIG. 2, in operation S203, the image processing circuit 125 generates the data D2 based on the input image data DIN2, and stores the data D2 to the storage space 152. In operation S204, in response to an interrupt signal, the controller 170 configures the image encoding circuit 130 to be able to access the storage space 151 through the connection port 0. In operation S205, the image encoding circuit 130 generates data D3 based on the data D2, and stores the data D3 to the storage space 152.

For example, the image processing circuit 125 perform image processing on the input image data DIN2 to generate the data D2, and store the data D2 to the storage space 152. In some embodiments, the input image data DIN1 includes multiple frames, and the input interface circuit 110, the auto-exposure circuit 115, the frame compression circuit 120, the image processing circuit 125 and the image encoding circuit 130 perform image processing sequentially on one frame after another so as to generate the corresponding data D1, D2 or D3. After a frame in the input image data DIN1 is completely transmitted, the input interface circuit 110 may issue an interrupt signal corresponding to the frame to trigger the controller 170, such that the controller 170 may accordingly determine that the frame compression circuit 120 has sufficient time to completely generate the data D1. In this case, the controller 170 may configure the data value of the first register above to the first predetermined value, such that the image encoding circuit 120 has access permission to access the storage space 151, and the multiplexer 140 may switch to transmit an output (that is, the data D3) of the image encoding circuit 130 to the storage space 151. In this case, the image encoding circuit 130 may read the data D2 from the storage space 152, generate D3 based on the data D2, and store the data D3 to the storage space 151. Similarly, after the data D3 (which may correspond to one frame; however, the present application is not limited to such example) is completely processed, the image encoding circuit 130 may issue an interrupt signal corresponding to the data D3 to trigger the controller 170, such that the controller 170 may accordingly determine that the image encoding circuit 130 has completely generated the data D3. In this case, the controller 170 may configure the data value of the first register above again to the second predetermined value, such that the image processing circuit 120 has access permission to access the storage space 151, and the multiplexer 140 may switch to transmit the output (that is, the data D1) of the image processing circuit 120 to the storage space 151. Thus, the data D1 and the data D3 corresponding to the next frame may be generated in continuation.

In operation S206, the frame decompression circuit 160 generates the data D4 based on the data D1. In operation S207, the multiplexer 145 outputs the data D3 from the storage space 151, or outputs the data D4 received from the frame decompression circuit 160 to the interface circuit 165. In operation S208, the interface circuit 165 outputs the data D3 and the data D4 to at least one host device.

For example, the controller 170 may output the data D1 from the storage space 151 to the frame decompression circuit 160, such that the frame decompression circuit 160 may generate the data D4 based on the data D1 and transmit the data D4 to the multiplexer 145. Alternatively, the controller 170 may output the data D3 from the storage space 151 to the multiplexer 145. The multiplexer 145 may sequentially output the data D3 and the data D4 to at least one host device according to the control of the controller 170, so as to perform different image applications according to the data D3 and the data D4.

As described above, the input image data DIN1 may include multiple frames, wherein a blanking period, for example, a vertical blanking interval (VBI), is present between two consecutive frames. In some embodiments, operation S201 to operation S203 may be performed within an effective period of a frame, and operation S204 to operation S207 may be performed within a blanking period between this frame and the next frame. Thus, the image processing device 100 may output the data D3 and the data D4 corresponding to the same frame. For example, within an effective period of a frame in the input image data DIN1 (or the input image data DIN2), the frame compression circuit 120 may generate the data D1 and store the data D1 to the storage space 151, and the image processing circuit 125 may generate the data D2 and store the data D2 to the storage space 152. Next, within the blanking period between the frame and the next frame, the image encoding circuit 130 may generate the data D3 based on the data D2 and store the data D3 to the storage space 151. Thus, other subsequent circuits may read the data D1 and the data D3 corresponding to the same frame from the storage space 151, and accordingly transmit the data D3 and the data D4 corresponding to the same frame to at least one host device.

The multiple operations in FIG. 2 are merely examples, and are not limited to being performed in the order specified in this example. Without departing from the operation means and ranges of the various embodiments of the present application, additions, replacements, substitutions or omissions may be made to the operations in FIG. 2, or the operations may be performed in different orders (for example, performed simultaneously or partially performed simultaneously). For example, in some embodiments, operation S202 and operation S203 can be performed simultaneously.

Figure 3:
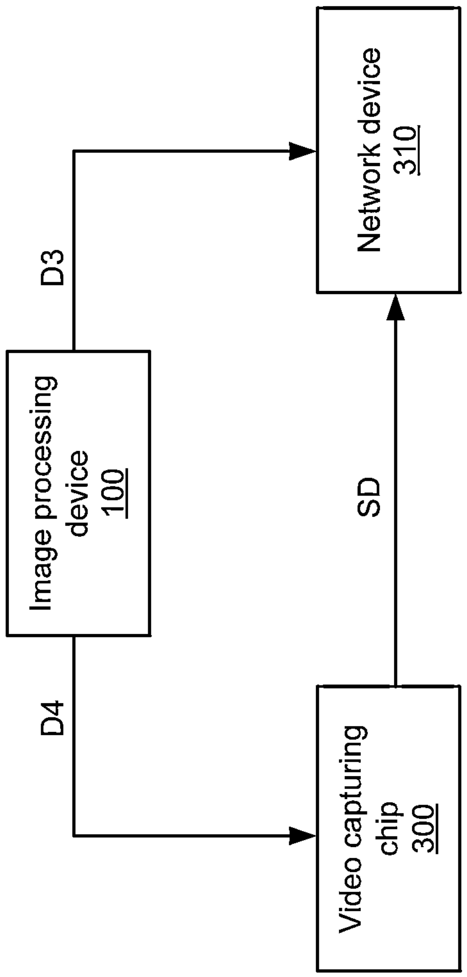
FIG. 3 is a schematic diagram of an application example of the image processing device in FIG. 1 according to some embodiments of the present application.

FIG. 3 shows a schematic diagram of an application example of the image processing device 100 in FIG. 1 according to some embodiments of the present application. In this example, at least one host device above includes a video capturing chip 300 and a network device 310. In some embodiments, the network device 310 may be coupled to the image processing device 100 via, for example but not limited to, a wireless network, to receive the data D3. The video capturing chip 300 may receive the data D4 from the image processing device 100, and generate a video stream SD based on the data D4 to thereby transmit the video stream SD to the network device 310 via a transmission interface In the example in FIG. 3, in order to prevent an overly large amount of data transmitted by a network, the image processing device 100 may transmit the data D3 with a smaller transmission data amount to the network device 310 so as to readily provide quick preview. Meanwhile, the image processing device 100 may transmit the data D4 with a larger transmission data amount to the video capturing chip 300 to thereby generate the video stream SD, and transmit the video stream SD to other devices (not shown) for browsing.

In some applications, the image processing device 100 may also transmit both of the data D3 and the data D4 to the video capturing chip 300, and the video capturing chip 300 may combine the data D3 and the data D4 to generate the corresponding video stream SD and transmit the video stream SD to the network device 310. In some applications, the image processing device 100 may also transmit both of the data D3 and the data D4 to the network device 310.

In some embodiments, when transmitting N sets of data D4 to at least one host device (that is, at least one of the video capturing chip 300 and/or the network device 310), the image processing device 100 may continue to transmit M sets of data D3 to the at least one host device, wherein the value N is a positive integer greater than 0 and the value M is a positive integer greater than 0 and smaller than or equal to N. For example, in the example in FIG. 3, when the video capturing chip 300 receives N sets of data D4, the network device 310 may receive N sets of data D3. Alternatively, when the video capturing chip 300 receives N sets of data D4, the network device 310 may receive 1 set of data D3. The value N and the value M above may be correspondingly adjusted according to actual application requirements.

Figure 4:
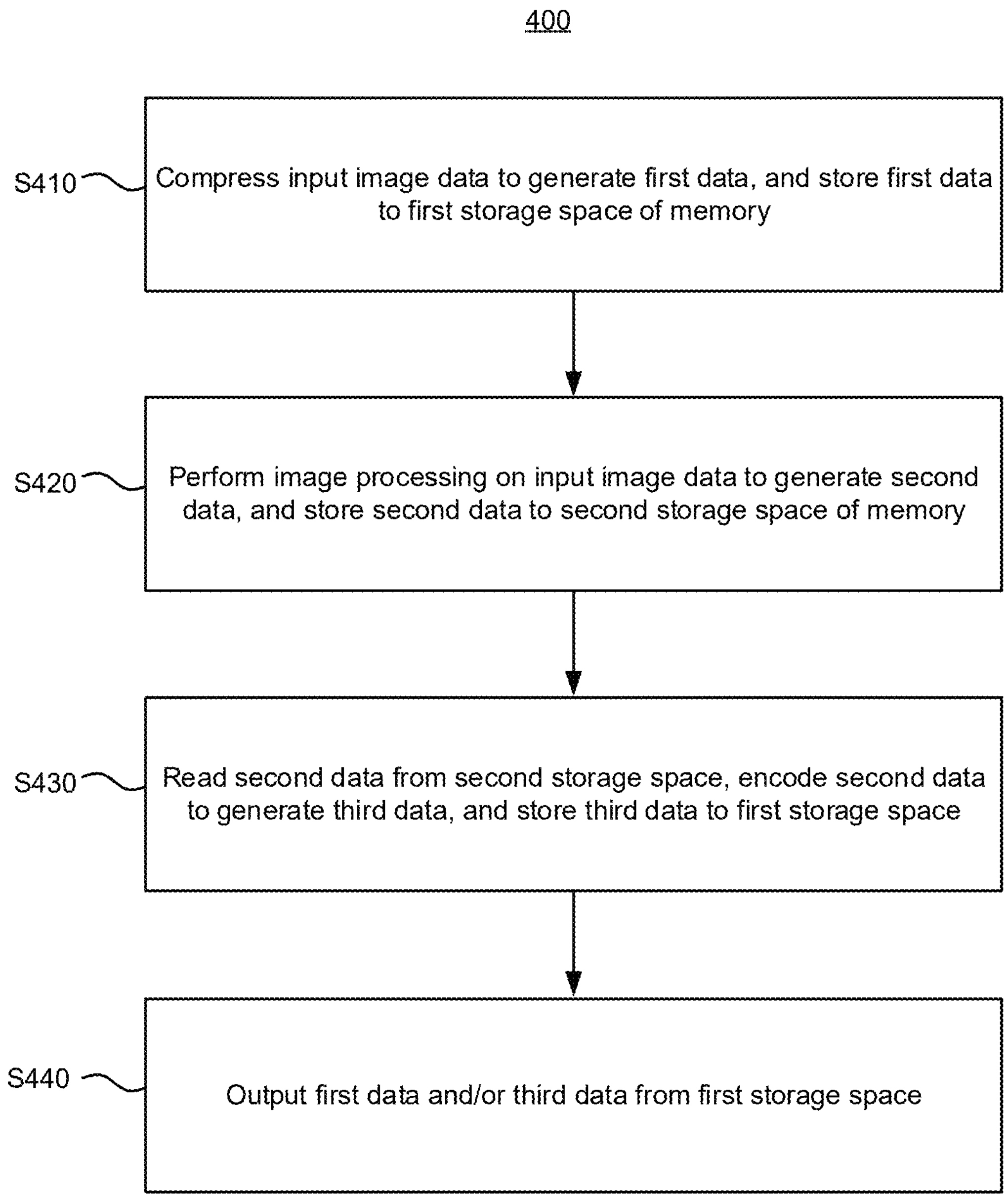
FIG. 4 is a flowchart an image processing method according to some embodiments of the present application.

FIG. 4 shows a flowchart an image processing method 400 according to some embodiments of the present application. In some embodiments, the image processing method 400 may be performed by, for example but not limited to, the image processing device 100 in FIG. 1.

In operation S410, input image data is compressed to generate first data, and the first data is stored to a first storage space of a memory. In operation S420, image processing is performed on the input image data to generate second data, and the second data is stored to a second storage space of the memory. In operation S430, the second data is read from the second storage space, the second data is encoded to generate third data, and the third data is stored to the first storage space. In operation S440, the first data and/or the third data is output from the first storage space.

Details associated with the multiple operations above can be referred from the details of the embodiments above, and are omitted herein. The multiple operations of the image processing method 400 are merely examples, and are not limited to being performed in the order specified in this example. Without departing from the operation means and ranges of the various embodiments of the present application, additions, replacements, substitutions or omissions may be made to the operations of the image processing method 400, or the operations may be performed in different orders (for example, performed simultaneously or partially performed simultaneously).

In conclusion, the image processing device and method according to some embodiments of the present application can utilize switching of a controller to have multiple circuits related to image processing to share a same storage space of a memory, and accordingly generate image data with different file formats corresponding to a same frame.

While the present application has been described by way of example and in terms of the preferred embodiments, it is to be understood that the disclosure is not limited thereto. Various modifications made be made to the technical features of the present application by a person skilled in the art on the basis of the explicit or implicit disclosures of the present application. The scope of the appended claims of the present application therefore should be accorded with the broadest interpretation so as to encompass all such modifications.

What is claimed is:

1. An image processing device, comprising:
- a memory, comprising a first storage space and a second storage space;
- a frame compression circuit, generating first data based on input image data and storing the first data to the first storage space;
- an image processing circuit, generating second data based on the input image data and storing the second data to the second storage space;
- an image encoding circuit, reading the second data from the second storage space, encoding the second data to generate third data, and storing the third data to the first storage space; and
- a controller, outputting the first data and the third data from the first storage space,
- wherein the frame compression circuit and the image encoding circuit access the first storage space through a first connection port, and the image processing circuit accesses the second storage space through a second connection port different from the first connection port, and
- wherein the input image data comprises a plurality of frames, and the image encoding circuit stores the third data to the first storage space within a blanking period between consecutive frames of the plurality of frames such that image data, corresponding to the input image data and having different formats for different image applications, is stored in the memory.

2. The image processing device according to claim 1, wherein the blanking period is a vertical blanking interval.

3. The image processing device according to claim 1, wherein the input image data comprises a frame, and the controller configures the image encoding circuit to access the first storage space in response to an interrupt signal corresponding to the frame.

4. The image processing device according to claim 1, wherein the controller configures the frame compression circuit to access the first storage space in response to an interrupt signal corresponding to the third data.

5. The image processing device according to claim 1, wherein a data size of the first data is greater than a data size of the third data.

6. The image processing device according to claim 1, wherein the first data is compressed raw image data, and the second data is a Joint Photographic Experts Group (JPEG) image file.

7. The image processing device according to claim 1, further comprising:
- a frame decompression circuit, generate fourth data based on the first data when the controller outputs the first data from the first storage space.

8. The image processing device according to claim 7, further comprising:
- an interface circuit, transmitting the fourth data and the third data to at least one host device.

9. An image processing method, comprising:
- compressing input image data to generate first data, and storing the first data to a first storage space of a memory;
- performing image processing on the input image data to generate second data, and storing the second data to a second storage space of the memory;
- reading the second data from the second storage space, encoding the second data to generate third data, and storing the third data to the first storage space; and
- outputting the first data and the third data from the first storage space,
- wherein the input image data comprises a plurality of frames, and the third data is stored to the first storage space within a blanking period between consecutive frames of the plurality of frames such that image data, corresponding to the input image data and having different formats for different image applications, is stored in the memory.

10. The image processing method according to claim 9, wherein the blanking period is a vertical blanking interval.

* * * * *